Feb. 7, 1967    W. A. SCHAICH    3,302,813

MULTI-PIECE CONTAINERS

Filed Feb. 3, 1964

INVENTOR.
W. A. SCHAICH
BY W. A. Schaich and
Spencer L. Blaylock, Jr.
ATTORNEYS

United States Patent Office 3,302,813
Patented Feb. 7, 1967

3,302,813
MULTI-PIECE CONTAINERS
Wilbur A. Schaich, Maumee, Ohio, assignor to Owens-Illinois, Inc., a corporation of Ohio
Filed Feb. 3, 1964, Ser. No. 342,168
4 Claims. (Cl. 220—4)

This invention relates generally to plastic containers and methods for forming them and more particularly to so-called deep drawn hollow plastic containers.

Utilization of thermoplastic materials to form containers for packaging applications has been greatly expanded in the last few years due to the availability of a wide range of plastic materials having deep draw forming characteristics, together with the concurrent development of automatic thermoforming machinery. Despite such progress, it is still a matter of some difficulty to produce a so-called "deep drawn" container wherein the height of the container is substantially in excess of the diameter or the maximum lateral dimensions of the container. When such containers are thermoformed from sheet material, the resulting thinning or stretching of the plastic material to form the container invariably results in the heel portion of the container, i.e., the juncture between the bottom and side walls of the container, being excessively thin in relationship to the side wall. If the processing variables are controlled so as to produce adequate material in such heel portions, then an excess of material invariably is incorporated in the side walls of the container, making the container uneconomical. The same problem is encountered when producing containers by blowing of a parison wherein a large blow up ratio is required. For the sake of simplicity, the term "deep drawn containers" will be employed generically in this specification to indicate any type of finished thermoplastic container wherein the height of the container is at least several times greater than the diameter or maximum lateral dimension of the container, and the term should not be construed to be limited to the particular method of production of the container, as the container may be formed either from a sheet or blown from a plastic tube or from a parison.

Utilization of deep drawn containers faces still another problem. Unless the external configuration of such containers permits the nesting of the containers for shipment, the resulting expense of shipping such a large volume, light-weight item from the producer's plant to the customer's or user's plant makes the cost of such container prohibitive. At the same time, packers generally insist on having unique container designs for identifying their particular product and hence if a deep drawn container must be limited to a cone-shaped design to permit nesting, the market for such containers is drastically reduced.

Accordingly, it is an object of this invention to provide an improved design for a deep drawn container which will overcome all of the aforestated problems.

Another object of the invention is to provide a deep drawn plastic container having a height substantially more than double its diameter in which all wall portions of the container, including the heel, are nevertheless undiminished in strength, which may be manufactured with optimum economy.

A further object of the invention is to provide a process for forming a composite container, having a height many times as large as its diameter, from two deep drawn components sealed together in a manner to reinforce critical portions.

A still further object of the invention is to provide novel composite containers made from cups nestable for shipment in the separated form and which may be joined together at the customer's or user's plant by simple inexpensive apparatus.

A still further object of the invention is to provide a container in several forms which is attractive in appearance and is constricted at the center or central portion to facilitate holding by the user or by automatic machinery employed in filling.

A still further object of the invention is to provide means and method for joining two cups in bottom-to-bottom relation and simultaneously punching out the common bottom portions while sealing the two bottom portions together during the punching operation.

These and other objects of the invention will become apparent from a reading of the following detailed description of this invention taken in connection with the accompanying drawings of which:

In achieving the objects of this invention, recognition is given to the economy of shipping inherent in nestable objects of cup shape where the sides are uniformly flared and the bottoms generally flat so that a minimum of space is required for shipping a quantity of containers. Applicant obtains the objective of complete nestability by separately forming and shipping nestable top and bottom portions of the composite container. The top portions of all containers are all alike and the bottom portions are also alike and nestable, although not necessarily the same as the top portion. By punching out the bottom portions of each cup in a diameter slightly less than the diameter of the flat portion of the cup bottom, one is able to seal together two containers at their respective smaller ends in a simple adhesive bonding step or in a heat sealing operation. Automatic machinery assembles the two cup portions bottom-to-bottom, pressing them together between two cylindrical dies through which a piston passes to perform the punching operation and complete the sealing of the edge portions of the cutaway bottoms.

Figure 3:
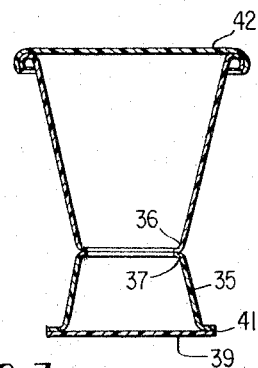
FIGURE 3 shows a simplified form of the container of FIGURE 2.

Applicant thus forms a composite container flared outwardly in both directions from the center, to which may be secured, by conventional means, a bottom closure and an upper closure of the desired type. Obviously, a large number of unique design shapes may then be achieved by variation of the height and/or degree of taper of the respective components. The same economy of manufacture and shape flexibility is achieved with varied forms of containers as illustrated in FIGURES 1 to 3.

Figure 1:
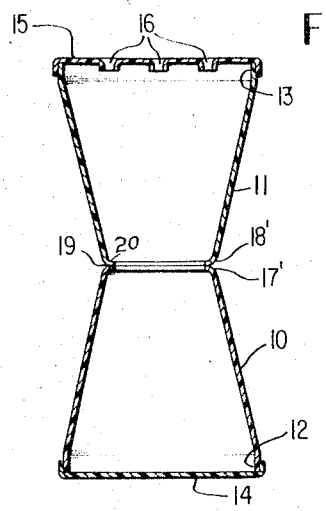
FIGURE 1 illustrates two like cup members joined at the periphery of their cut out bottoms, one outer end being permanently closed and the opposite end being provided with a dispensing top; thereby forming a composite, deep drawn container.
Figure 2:
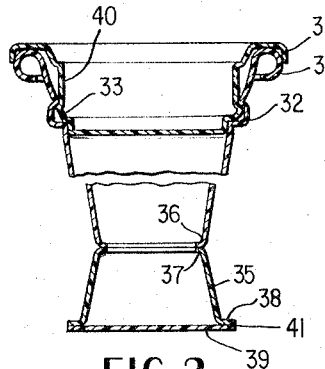
FIGURE 2 shows an alternate form of the basic composite container in which a shallower cup is used to form the bottom portion of the composite container and in which the bottom closure is formed of sheet material sealed thereto, a modified form of top closure being illustrated.
Figure 4:
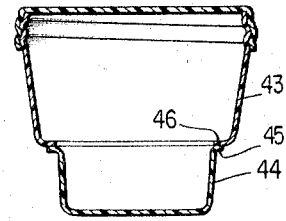
FIGURE 4 shows a stepped composite container in which upper and lower portions are both flared outwardly toward the top and in which one step of the manufacturing process has been eliminated.
Figure 5:
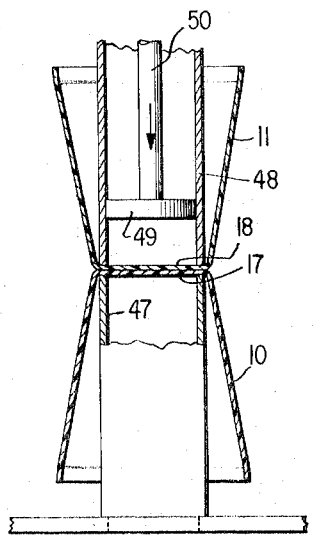
FIGURE 5 and FIGURE 6 show successive steps in the punching and sealing operation as adapted to forming the composite containers of FIGURES 1 and 3.
Figure 6:
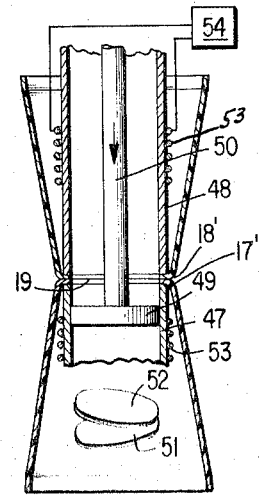

In the embodiment of FIGURE 4, a shallow cup 44 having an out-turned top edge joins to the bottom of the upper cup 43 as in FIGURE 1 after the latter has been appropriately punched, thus providing further choice of shape. The seal is effected generally as illustrated in FIGURES 5 and 6 except that the lower cylinder 47 receives the lower cup 44 therein rather than therearound, to effect sealing of the inwardly extending flange 46 of the upper cup 43 to the outwardly extending flange 45 of the lower cup 44.

In one type of a container, according to this invention, two like cups are formed of polystyrene, polyethylene, and the like, from sheet stock of appropriate thickness. The plastic sheet material may be formulated to resist hot liquids, paints, oils or dry materials. A disposable container such as a milk bottle or household cleaner bottle may have a capacity such as one quart, which may not be satisfactorily formed in a single piece from uniform sheet material since the heel would be too weak and the straight sides would be too flexible for handling. By forming a composite container, two container components each of one pint capacity may be used with a minimum wall thickness, such that a single container of that capacity and thickness would be structurally unsatisfactory. By the construction here disclosed, the weakest portions at the heels of the respective components are mutually reinforced by bonding to each other, and are not subject to damaging contact as the composite container is filled, shipped or handled because the heel portions are of smaller diameter and are not in contact with a support while in use, by bonding to each other.

Referring now to the drawings wherein like reference numerals refer to like parts. Reference numeral 10 denotes a first plastic cup 10 which may be identical with a second plastic cup 11, both formed according to conventional molding operations. Each cup may have a cylindrical lip as at 12 and 13 respectively, for securing bottom 14 and closure 15 thereto by heat sealing or adhesive bonding. Closure 15 may have perforations 16 of desired form to provide a dispensing top. Cups 10 and 11 are cemented or heat sealed adjacent to heels 17' and 18', respectively, at 19, generally along a planar bottom surface of each. Bottoms 17 and 18 of cups 10 and 11 may be cut out or pressed to form an opening jointly therethrough either before or after the joint 19 is made depending on the method employed for making the junction 19. As illustrated in FIGURES 5 and 6, the cups may be sealed together and the bottom punched out in a single operation to be described hereinafter. As shown in FIGURE 1, a substantial ridge remains between cups 10 and 11 after the bottoms 17 and 18 are cut away but it will be appreciated that this radially inwardly extending remnant of the bottoms can be quite narrow to form an annular rib 20 of minimum width.

Various known solvents may be applied to bottoms 17 and 18 and the two pressed together by automatic presses and held for a time sufficient to secure an impervious seal. Polystyrene and polyethylene are suitable examples of thermoplastic materials of low cost, of which polystyrene has the advantage of greater rigidity and generally lower cost. It will be appreciated that the sealed junction between cylindrical portions 12 and 13 and cover portions 14 and 15 may be made by cementing, spin welding, or other suitable heat and pressure applications to effect a tight and strong seal.

Figure 1A:
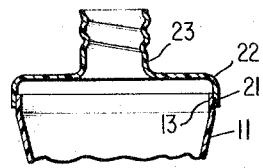
FIGURE 1a shows an alternate dispensing top for the container of FIGURE 1.

In FIGURE 1a cup 11 is provided with a dispensing closure having a screw top. A cylindrical portion 21 depends from a shoulder 22 having thereon a threaded neck 23 suitable for receiving a screw closure, or the like (not shown).

Figure 1B:
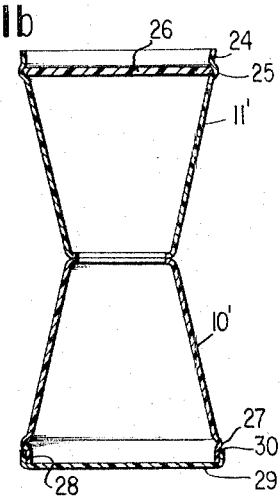
FIGURE 1b shows an alternate means of securing the container lid and bottom members.

FIGURE 1b illustrates a cup such as 11' having in place of the cylindrical portion 13 a continued extension of the flared side as at 24 in which is formed an exteriorly extending groove 25 suitable for receiving a lid 26 of the type normally used for milk bottle lids. Preferably, the flared portion 24 extends to a diameter less than the diameter of the groove 25. Two like cups may be employed for the manufacture of the composite container whereof the bottom cup member has a groove 27 upward from the flared portion 28. The lower cover 29 is attached to the flared portion 28 in lieu of the bottom portion 14 of FIGURE 1. When the diameter of the portion 28 is less than the diameter of the groove 27, it will be evident that the lower cover may extend past the flared portion and into contact with the groove 27. A seal 30 may be formed therebetween by cementing or otherwise causing the upturned edge of cover 29 to engage the exterior surface of groove 27 in firm supporting contact. Thus the portion of the container requiring greatest strength, namely, the bottom, may be provided with a reinforcing cover 29 which supports the inverted cup 10' both at the edge thereof and at the groove 27. Seal 30 may also be formed by spin welding when the materials are appropriately selected for the purpose. Cover 29 may compress flared portions 28 essentially to the cylindrical form shown.

In FIGURE 2 a modified form of cup 11 is shown joined to a cup 35 of different shape for increased strength for a given wall thickness. In this case, the upper cup has a groove 32 similar to the groove 25 of FIGURE 1b and has an upper beaded edge 31 formed by rolling or the like to produce a suitable strengthened lip. An interior fitting closure member 40 is provided with an outwardly extending rib 33 to engage groove 32 of the upper cup. The closure 40 has a lip 34 which overhangs the beaded edge 31 to provide means for prying the closure 40 from the cup; the lower cup member 35 has increased taper and a shorter length terminating in a sealed junction at the bottoms of the two cup members at flanges 36 and 37 thereof in the manner of the junction 19 of FIGURE 1. A broadened base is provided for the container of FIGURE 2 by changing the cylindrical portion 12 as in FIGURE 1 to a radial flange 38 adapted to receive thereagainst the sheet member 39 at a sealed junction 41. Member 39 is readily made of increased thickness when required. A container of the type of FIGURE 2 has many industrial uses and is simple and inexpensive to manufacture while being sufficiently strong for shelf storage of chemicals and liquid materials of high density.

FIGURE 3 shows a simplified version of the basic cup of FIGURE 2 employing the same shortened and strengthened cup 35 joined to the upper cup at flanges 36 and 37 and to the bottom sheet member 39 at 41. A closure 42 may be identical to the bottom portion 14 of FIGURE 1 which is a snap fitted closure. It may be also perforated as at 16 or provided with a screw cover as at 23.

FIGURE 4 illustrates a further simplified container in which a smaller cup 44 is secured to the upper cup 43 by an outwardly turned flange 45 of the cup 44 and an inwardly turned bottom flange 46 of cup 43. One advantage in the construction according to FIGURE 4 is the provision of a completely nestable composite container, inasmuch as the cups 43 and 44 are each nestable with respect to the other like cups and the annular junction between flanges 45 and 46 has an internal diameter at least equal to the exterior diameter of the cup 44. The composite structure of FIGURE 4 may have a cup portion 44 of heavier material if desired to provide sufficient strength and rigidity. This construction eliminates the need for the punching operation on the bottom of the container 44 and of the separate sealing thereto of a cover member such as 14 or 39. In addition, it will be appreciated that a compartmental structure may be formed merely by the placing of a barrier or diaphragm across the bottom of cup 43 above flange 46 providing, if desired, a groove such as shown at 25 to receive a diaphragm such as at 26.

The punching operation for removing the major portion of bottoms 17 and 18 to form the annular rib 20 is illustrated in FIGURES 5 and 6. A lower cylinder 47 of diameter slightly less than that of cup 10 supports, in inverted position, one cup 10 against which is pressed another cup 11 by a similar cylinder 48 in which a piston 49 is moved on actuation of piston rod 50 according to suitable controlled reciprocating action (not shown). The cylinder 47 is aligned with the cylinder 48 in a jig structure (not shown) such that actuation of the piston 49 punches out a circular opening in bottoms 17 and 18 equal to the inner diameter of the cylinder 47. The punched out portions are shown at 51 and 52 dropping away from the piston 49. It will be appreciated that parts 47, 48, 49 and 50 may otherwise be referred to as a die and punch arrangement.

Forming dies 47 and 48 may be pressed together with force nearly sufficient to cause pressure sealing thereof, and as punch 49 is passed through bottoms 17 and 18, a seal 19 is formed by the added pressure and friction caused thereat. If additional heating is required for this purpose, it may be supplied by a conventional heating coil 53 placed either about cylinder 47 or about cylinder 48, or both, energized from a controlled power supply 54. In the manufacture of a container as in FIGURE 4, the cylinders 47 and 48 effect the seal of the cup 43 to the cup 44 after the punching operation which removes the bottom of the cup 43. The punching operation may be performed prior to shipment, or at the time of sealing the cups together, as may be least expensive under the particular conditions of use, all with economy of shipping cost and manufacturing facilities.

It will be appreciated that the cylinders 47 and 48 may also be employed with or without the punch 49 and may be used in cementing cup 10 to cup 11 or cup 44 to cup 43 in which case cement may be applied to the cup bottoms before they are pressed together by cylinders 47 and 48. Punching operations might occur either thereafter or therebefore for cups 10, 11, but cup 43 would normally be punched in advance and cement applied on the flange 46 or flange 45 before these flanges were pressed together between cylinders 47 and 48.

It will now be evident that a composite container according to FIGURES 1, 2 or 3 is provided with an inverted base cup having a downwardly flared configuration closed at the large end to form the bottom of a container sealed to an upright cup having a like base diameter each provided with a cutout central portion extending very nearly to the sidewall. A radial flange has cemented or heat sealed thereto a flange comprising the uncut bottom portion of another cup to form a reinforced rib 20 extending toward the center of the composite container.

It should be further noted that the utilization of radial flange portions of the two cups as the sealing puncture permits such seal to be reliably made by a plurality of known automated techniques, such cementing, heat and pressure sealing, spin welding, or the like.

It will be noted that the resulting structure has greatest strength at the center portion where flanges reinforce each other in all directions. Slanted wall portions of cups also aid in reinforcement of the whole structure. Open ends of cups 10, 11, 35, and 43 are each reinforced according to this invention by the covers 14, 15, 22, 26, 29, 39 or 40. A cup as in FIGURE 1 has twice the capacity of a single cup of maximum dimensions for a particular weight of material but is stronger than a single cup of half the capacity because the heel portions which are thinned by deep drawing are not exposed to damage and because the resulting shape makes the container retainable by hand or by machine with less grasping force.

While the invention has been described with reference to an exemplary embodiment, it will be understood that other equivalent structures and modes of operation are intended to be included within the spirit and scope of the appended claims.

What is claimed is:

1. A plastic container comprising first and second deep drawn cup-shaped components, each of said components including a sidewall portion and a bottom portion formed integrally therewith, said bottom portions being adhered together and having apertures therein to permit communication between the components.

2. A plastic container comprising first and second deep drawn components, each of said components including a sidewall portion and a bottom portion, the juncture between said sidewall portion and said bottom portion being too weak to support such component filled with product, each of said bottom portions having an aperture therethrough forming the edge of a radially inwardly directed peripheral ring, said rings being sealed together.

3. A plastic container comprising first and second deep drawn, cup-shaped components, each of said components including a sidewall portion and a bottom portion, said sidewall portions flaring upwardly and outwardly from said bottom portions, the junctures between said sidewall portions and said bottom portions being weaker than the remainder of the respective components, each of said bottoms having an aperture therethrough defining the edge of a radially inwardly directed ring, means for sealing said rings together, and means for closing the ends of said components.

4. A plastic container comprising first and second cup-shaped components, at least one of said components being formed by deep drawing, said cup-shaped components including a sidewall and bottom portion formed integrally therewith, the juncture between the sidewall portion and the bottom portion being weaker than the remainder of said cup-shaped component, said bottom having an aperture therethrough defining the edge of a radially inwardly directed ring, and means for sealing said ring to said second component to form a seal intermediate the ends of the finished container.

References Cited by the Examiner

UNITED STATES PATENTS

| | | | |
|---|---|---|---|
| 216,831 | 6/1879 | Collings | 220—4 |
| 2,099,055 | 11/1937 | Ferngren. | |
| 2,798,631 | 7/1957 | Engel | 220—4 |
| 3,171,580 | 2/1965 | Davis | 215—1.5 X |
| 3,215,300 | 11/1965 | Lynch | 220—4 |

FOREIGN PATENTS

| | | |
|---|---|---|
| 1,019,108 | 1/1953 | France. |
| 1,196,104 | 11/1959 | France. |

THERON E. CONDON, *Primary Examiner.*

GEORGE E. LOWRANCE, *Examiner.*